US011106645B1

(12) United States Patent
Shemer et al.

(10) Patent No.: US 11,106,645 B1
(45) Date of Patent: Aug. 31, 2021

(54) MULTI POINT IN TIME OBJECT STORE

(71) Applicant: EMC Corporation, Hopkinton, MA (US)

(72) Inventors: Jehuda Shemer, Kfar Saba (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 539 days.

(21) Appl. No.: 14/868,884

(22) Filed: Sep. 29, 2015

(51) Int. Cl.
*G06F 7/00* (2006.01)
*G06F 17/00* (2019.01)
*G06F 16/22* (2019.01)
*G06F 16/27* (2019.01)
*G06F 16/955* (2019.01)

(52) U.S. Cl.
CPC .......... *G06F 16/2228* (2019.01); *G06F 16/27* (2019.01); *G06F 16/955* (2019.01)

(58) Field of Classification Search
CPC ......... G06F 17/30321; G06F 17/30575; G06F 17/30876
USPC ........................................................ 707/639
See application file for complete search history.

(56) References Cited

U.S. PATENT DOCUMENTS

| | | | | |
|---|---|---|---|---|
| 6,502,108 B1* | 12/2002 | Day, III | ............... | G06F 11/0751 |
| 8,650,156 B1* | 2/2014 | McHugh | ................. | G06F 12/12 707/638 |
| 8,966,198 B1* | 2/2015 | Harris | ................... | G06F 3/0619 711/161 |
| 2003/0101321 A1* | 5/2003 | Ohran | ................. | G06F 11/1451 711/162 |
| 2004/0167898 A1* | 8/2004 | Margolus | ............ | G06F 16/2358 |
| 2005/0063374 A1* | 3/2005 | Rowan | ................ | G06F 11/1471 370/382 |
| 2006/0156059 A1* | 7/2006 | Kitamura | ............ | G06F 11/1092 714/6.21 |
| 2007/0226730 A1* | 9/2007 | Coyle | ................... | G06F 16/289 717/170 |
| 2008/0002272 A1* | 1/2008 | Riedel | ...................... | G11B 5/02 360/55 |
| 2009/0327805 A1* | 12/2009 | Thiel | ..................... | G06F 16/273 714/15 |
| 2010/0070478 A1* | 3/2010 | Anglin | ................ | G06F 11/1464 707/674 |
| 2012/0136835 A1* | 5/2012 | Kosuru | ............... | G06F 11/2094 707/654 |
| 2012/0185762 A1* | 7/2012 | Ozer | ...................... | G06F 40/197 715/229 |
| 2013/0132346 A1* | 5/2013 | Varadarajan | ........ | G06F 11/1448 707/639 |
| 2014/0108717 A1* | 4/2014 | Tian | ....................... | G06F 3/0685 711/108 |

(Continued)

*Primary Examiner* — Binh V Ho
(74) *Attorney, Agent, or Firm* — Krishnendu Gupta; Deepika Bhayana; Dorothy Wu Chiang

(57) ABSTRACT

A System, Computer Program Product, and Computer-executable method for managing an object based storage within a cloud storage provider, the System, Computer Program Product, and Computer-executable method including receiving a data I/O, determining whether the data I/O relates to an existing object within the object based storage, if the data I/O relates to an existing object, updating a stream and existing data object in the object based storage, and creating a new data object and key based on the data I/O and updating the object based storage.

20 Claims, 18 Drawing Sheets

(56) References Cited

U.S. PATENT DOCUMENTS

| | | | |
|---|---|---|---|
| 2014/0304526 A1* | 10/2014 | Grube | H04L 9/3236 |
| | | | 713/193 |
| 2014/0324463 A1* | 10/2014 | Buck | G16H 40/67 |
| | | | 705/3 |
| 2015/0244795 A1* | 8/2015 | Cantwell | G06F 16/27 |
| | | | 709/202 |
| 2016/0283501 A1* | 9/2016 | Konig | G06F 16/11 |
| 2017/0104587 A1* | 4/2017 | Barney | H04L 63/0428 |
| 2018/0007034 A1* | 1/2018 | Leggette | G06F 16/172 |

\* cited by examiner

1

MULTI POINT IN TIME OBJECT STORE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATION

This application is related to U.S. application Ser. No. 14/868,879, entitled "CLOUD OBJECT STORE VIRTUALIZATION" filed on even date herewith, the teachings of which is herein incorporated by reference in its entirety.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A System, Computer Program Product, and Computer-executable method for managing an object based storage within a cloud storage provider, the System, Computer Program Product, and Computer-executable method including receiving a data I/O, determining whether the data I/O relates to an existing object within the object based storage, if the data I/O relates to an existing object, updating a stream and existing data object in the object based storage, and creating a new data object and key based on the data I/O and updating the object based storage.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
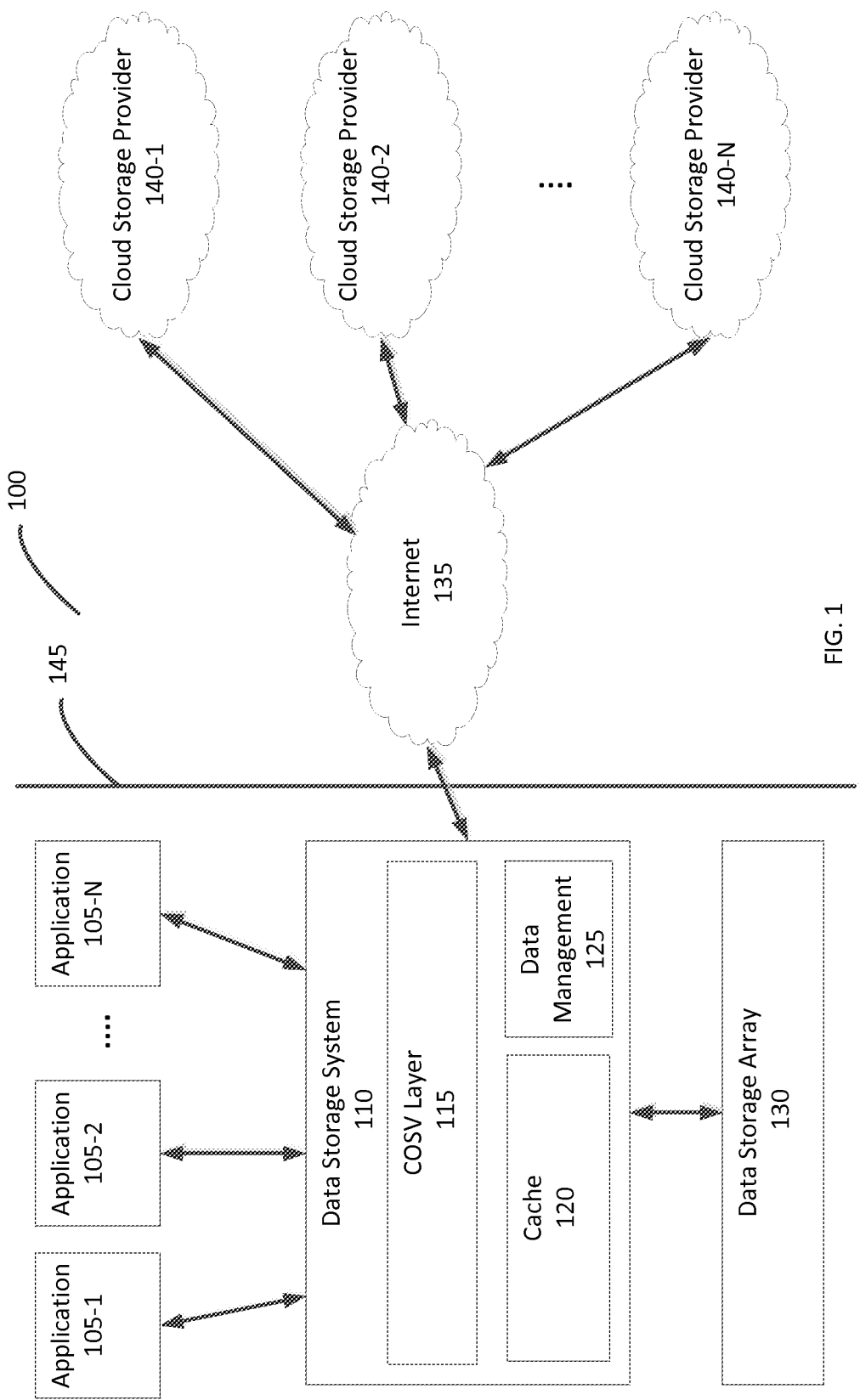
FIG. 1 is a simplified illustration of a data storage system providing applications access to cloud storage providers using a Cloud Object Store Virtualization Layer, in accordance with an embodiment of the present disclosure.

Traditionally, cloud storage providers (CSPs) provide data storage services to consumers of data storage, such as users and/or applications. Typically, one such service is using object based storage. Generally, object based storage is a cost effective method of providing data storage services from a CSP. Typically, object based storage scales linearly as more data storage nodes are added to a CSP's data centers. Conventionally, CSPs provide narrow interfaces into their object based data storage systems. Traditionally, improvements to object based storage would be beneficial to the data storage industry.

Typically, object based storage (OBS) refers to data repositories where blobs of data are placed. Conventionally, these blobs of data are called objects. Generally, these objects can be anywhere from a few bytes to data to several megabytes of data. Conventionally, objects are referenced to by keys. Traditionally, a key is either a random value or a string that can look like a file path. Generally, OBS provides narrow interfaces into their data repositories. Typically, an OBS system solely provides the functionally to add, remove, and update objects within the OBS system. Traditionally, some OBS provided by Cloud Storage Providers (CSPs) provide some additional functionality, such as grouping (like directories), filtering, indexing (of keys and objects), encryption, and possibly version tracking of objects. However, typically, OBS implementations differ between CSPs. Generally, the heterogeneous nature of OBS implementations among different CSPs incentivizes users to maintain their data stores within a single CSP. Conventionally, a user confining themselves to a single CSP, and hence a single implementation of an OBS, limits the user's ability to manage and/or move their data.

Cloud Object Store Virtualization

In many embodiments, the current disclosure may enable a user and/or administrator to utilize a cloud object store virtualization (COSV) which may create a layer between an application and cloud storage provided by a cloud storage provider. In various embodiments, the current disclosure may enable a user and/or administrator to access cloud storage through a standard Application Programming Interface (API) regardless of which cloud storage provider and/or Object based Storage (OBS) implementation utilized. In certain embodiments, the current disclosure may enable feature parity across cloud storage providers. In some embodiments, the current disclosure may enable implementation of advance data storage services utilizing cloud storage providers implementing OBS. In other embodiments, the current disclosure may enable smart location and/or relocation of objects in an OBS according to cloud pricing, optimal performance, geographic location, and/or cloud feature availability. In most embodiments the current disclosure may enable non-disruptive migration of data between cloud storage providers and/or implementations of OBS. In certain embodiments, the current disclosure may enable object key conversions between two or more OBS implementations, even when an OBS implementation may be incompatible with one or more other OBS implementations.

In most embodiments, the current disclosure may enable creation of a cloud object store virtualization (COSV) layer. In various embodiments, a COSV layer may enable to expose a standardized and/or customized interface to popular cloud implementations. In certain embodiments, a COSV layer may be enabled to be implemented as a set of appliances. In some embodiments, a COSV layer may be enabled to be implemented as a single appliance. In other embodiments, a COSV layer may be enabled to be implemented within a cloud implementation. In some embodiments, a COSV layer may be enabled to track keys within the OBS and may be enabled to make intelligent decisions what to do with objects.

In most embodiments, a COSV layer may be enabled to provide feature parity across cloud providers. In various embodiments, a COSV layer may be enabled to provide object caching. In certain embodiments, a COSV layer may be enabled to facilitate high availability between cloud implementations and/or cloud storage providers. In some embodiments a COSV layer may be enabled to provide multi-copy functionality in the same or different clouds. In many embodiments, a COSV layer may be enabled to provide smart location and/or relocation of objects according to one or more facts. In various embodiments, factors may include, but are not limited to, cloud pricing, optimal performance, geographic location, and cloud feature availability. In certain embodiments, a COSV layer may be enabled to provide non-disruptive cloud object storage migration. In other embodiments, a COSV layer may be enabled to provide key conversion between incompatible cloud platforms. In most embodiments, an application, user and/or administrator may be enabled to route API calls through a COSV layer. In various embodiments, a COSV layer may be enabled to handle I/Os, commands, and/or management of underlying Object Based Storage in real time.

Refer to the example embodiment of FIG. 1. FIG. 1 is a simplified illustration of a data storage system providing applications access to cloud storage providers using a Cloud Object Store Virtualization Layer, in accordance with an embodiment of the present disclosure. As shown, system 100 includes data storage system 110, data storage array 130, and cloud storage providers (140-1 ... N, 140 Generally). Data storage system 110 includes Cloud Object Store Virtualization (COSV) Layer 115, data management module 125, and cache 120. Data storage system 110 is in communication with data storage array 130 and internet 135. While only CSP 140-1, CSP 140-2, and CSP 140-N are shown, data storage system 110 is enabled to communicate with one or multiple Cloud Storage Providers. Data storage system 110 is enabled to provide Object based storage to Applications (105-1 ... N, 105 Generally) utilizing COSV Layer 115.

In this embodiment, COSV Layer 115 enables data storage system 110 to communicate and/or interact with CSPs 140 utilizing internet 135. COSV Layer 115 is enabled to provide Applications 105 with Object Based storage utilizing CSPs 140, cache 120, and/or data storage array 130. In many embodiments, a data storage system utilizing a COSV Layer may include and/or have access to data storage external to the data storage system such as, but not limited to, cache, rotational disk storage arrays, flash storage arrays, hybrid storage arrays, and/or other data storage appliances. In this embodiment, system 100 is divided into two portions divided by line 145. Items to the left of line 145, such as data storage system 110, data storage array 130, and applications 105, are enabled to located locally and/or within a user's system and/or firewall. Items to the right of line 145, such as internet 135 and CSPs 140 represent resources outside of a user's system and/or firewall.

In many embodiments, a data storage system using a COSV Layer may be implemented in multiple ways. In various embodiments, a COSV Layer may be implemented within a user's operating space (i.e., locally, within a user's domain, corporation's firewall). In certain embodiments, a COSV Layer may be implemented within one or more remote systems, such as, but not limited to, a data center or within the cloud. In most embodiments, a COSV Layer may enable applications utilizing the COSV Layer to use one or more cloud storage providers without knowing which implementation of object storage may be used. In certain embodiments, a COSV Layer may provide a standard interface through which one or more applications may be enabled to access one or more multiple cloud storage providers managing one or multiple object stores. In some embodiments, a COSV Layer may enable an application and/or users of the COSV Layer to change underlying cloud resources without any upstream changes to an application's or user's interface.

Figure 2:
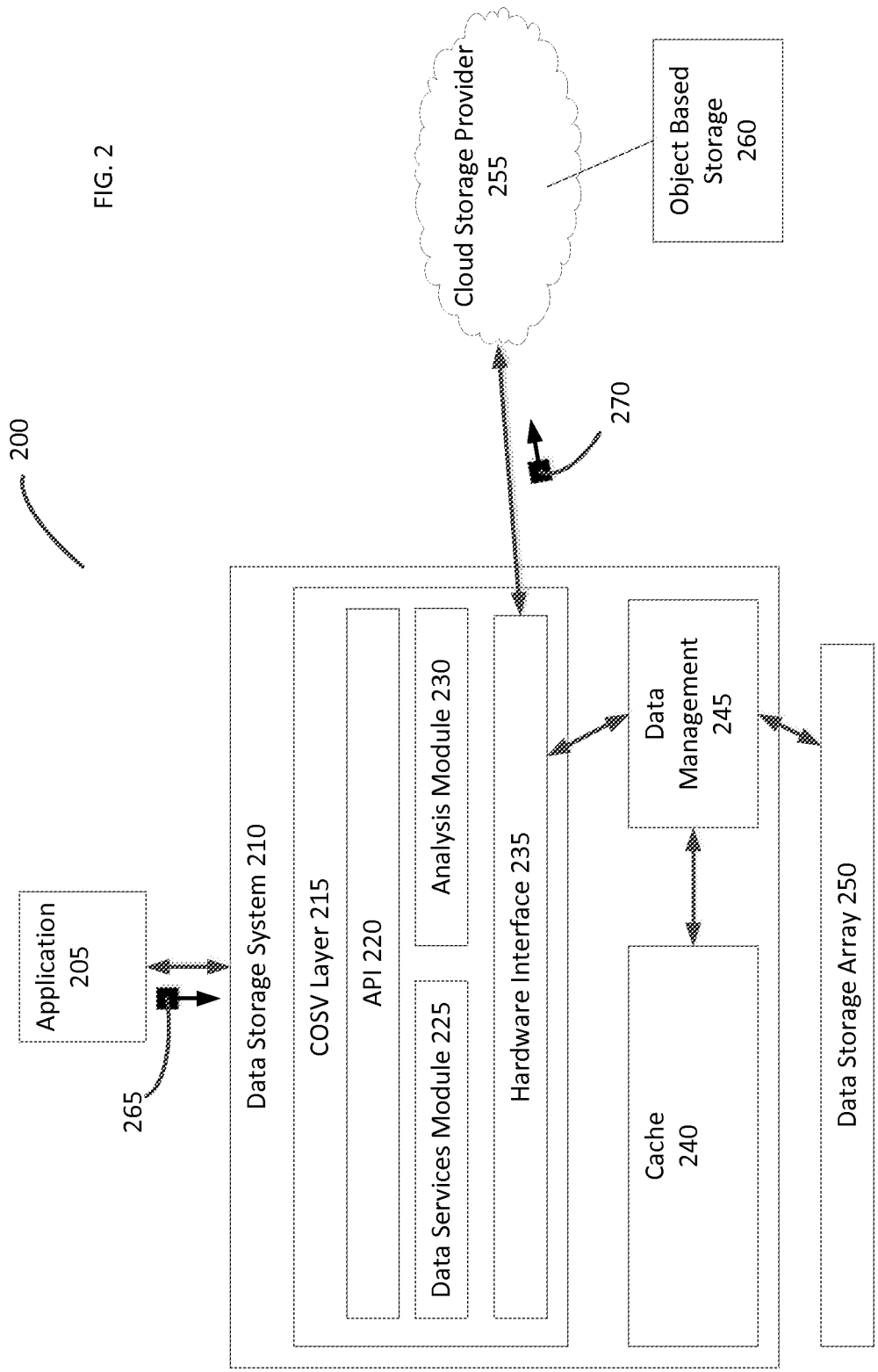
FIG. 2 is a simplified illustration of a first state of a simplified implementation of a Cloud Object Store Virtualization Layer, in accordance with an embodiment of the present disclosure.

Refer to the example embodiment of FIG. 2. FIG. 2 is a simplified illustration of a first state of a simplified implementation of a Cloud Object Store Virtualization Layer, in accordance with an embodiment of the present disclosure. System 200 includes data storage system 210, data storage array 250, and cloud storage provider (CSP) 255. Data storage system 210 is in communication with Cloud Storage Provider 255 through an internet connection, which is not shown for simplicity. Data storage system 210 incudes Cloud Object Store Virtualization (COSV) Layer 215, data management module 245, and cache 240. COSV Layer 215 includes Application Programming Interface (API) 220, Data Services Module 225, Analysis module 230, and Hardware Interface 235. Hardware Interface 235 is enabled to communicate instructions from COSV Layer 215 to data management module 245 and cloud storage provider 255. Cloud Storage Provider 255 includes Object Based Storage 260.

Application 205 is enabled to access object storage through data storage system 210. In this embodiment, data storage system 210 is enabled to provide object based storage 260 using cloud storage provider 255. Applications 205 is enabled to send and/or receive updates to one or more data objects stored within object based storage 260 utilizing data storage system 210. Application 205 is enabled to send message 265, which includes a request in relation to one or more objects stored within object based storage 260, to data storage system 210. Data storage system 210 is enabled to direct COSV Layer 215 to manage message 265. API 220 is enabled to direct message 265 to data services module 225, which is enabled to execute one or more actions based on the contents of message 265. Data services module 225 is enabled to direct analysis module 230 and Hardware Interface 235 to manage message 265 and/or provide data services for application 205. Hardware Interface 235 is enabled to send message 270 to communicate with Cloud storage provider 255 with regards to Object Based Storage 260. Hardware Interface 235 is enabled to communicate with cache 240 and data storage array 250 provide data services.

Figure 3:
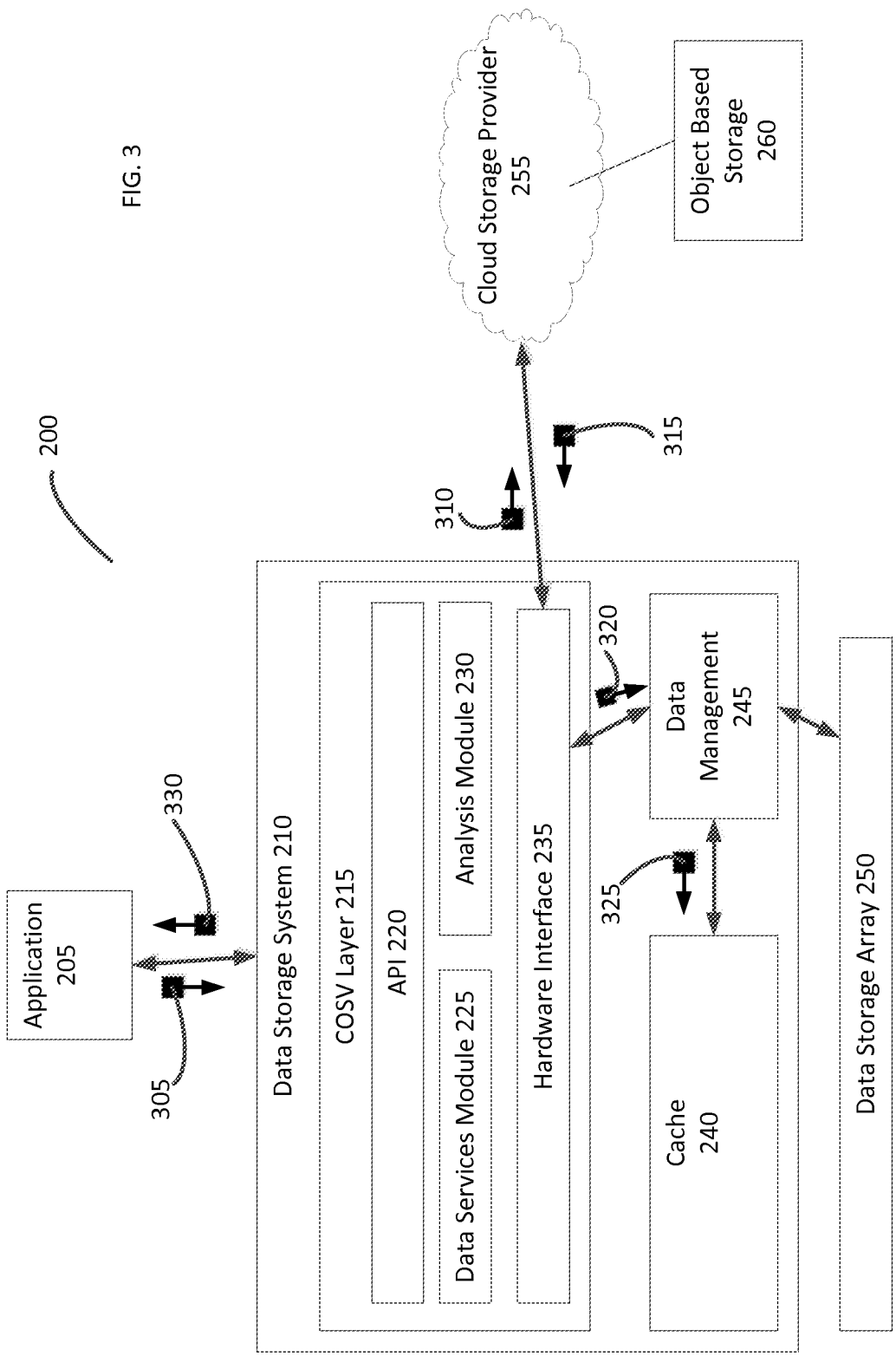
FIG. 3 is a simplified illustration of a second state of a simplified implementation of a Cloud Object Store Virtualization Layer, in accordance with an embodiment of the present disclosure.

Refer to the example embodiment of FIG. 3. FIG. 3 is a simplified illustration of a second state of a simplified implementation of a Cloud Object Store Virtualization Layer, in accordance with an embodiment of the present disclosure. System 200 includes data storage system 210, data storage array 250, and cloud storage provider (CSP) 255. Application 205 is enabled to send message 305 and is enabled to receive message 330. Hardware Interface 235 is enabled to communicate with data management module 245 using message 320. Hardware Interface 235 is enabled to communicate with cloud storage provider 255 using message 310 and message 315. data management module 245 is enabled to communicate with cache 240 using message 325.

Figure 4:
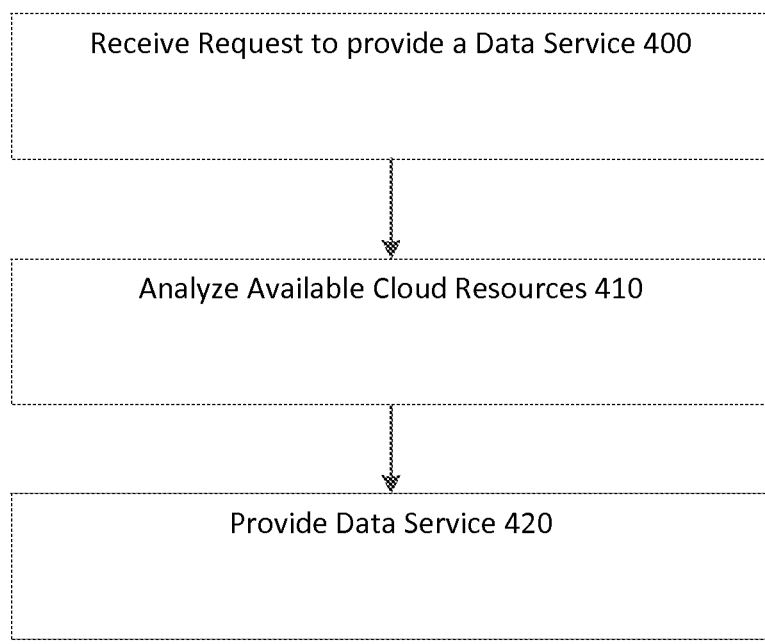
FIG. 4 is a simplified flowchart of a method of providing data services from the system shown in FIG. 2, in accordance with an embodiment of the present disclosure.

Refer to the example embodiments of FIGS. 2 and 4. FIG. 4 is a simplified flowchart of a method of providing data services from the system shown in FIG. 2, in accordance with an embodiment of the present disclosure. System 200 includes data storage system 210, data storage array 250, and cloud storage provider (CSP) 255. In this embodiment, Application 205 is in communication with data storage system 210. Application 205 sends message 265 to data storage system 210. Data Storage system 210 receives message 265 and directs message to COSV Layer 215. COSV Layer 215 uses API 220 to direct message 265 to data services module 225. In this embodiment, COSV Layer 215 determines that Message 265 contains a request to provide one or more data services (Step 400). Data Services Module 225 directs analysis module 230 to analyze available cloud resources (Step 410). Analysis module 230 determines that data storage system 210 has cloud storage provider 255, cache 240, and data storage array 250 available to provide one or more data services. Data services module 225 determines whether the requested data service is available. If the requested data service is available, data services module 225 provides the requested data service to Application 205 (Step 420).

Figure 5:
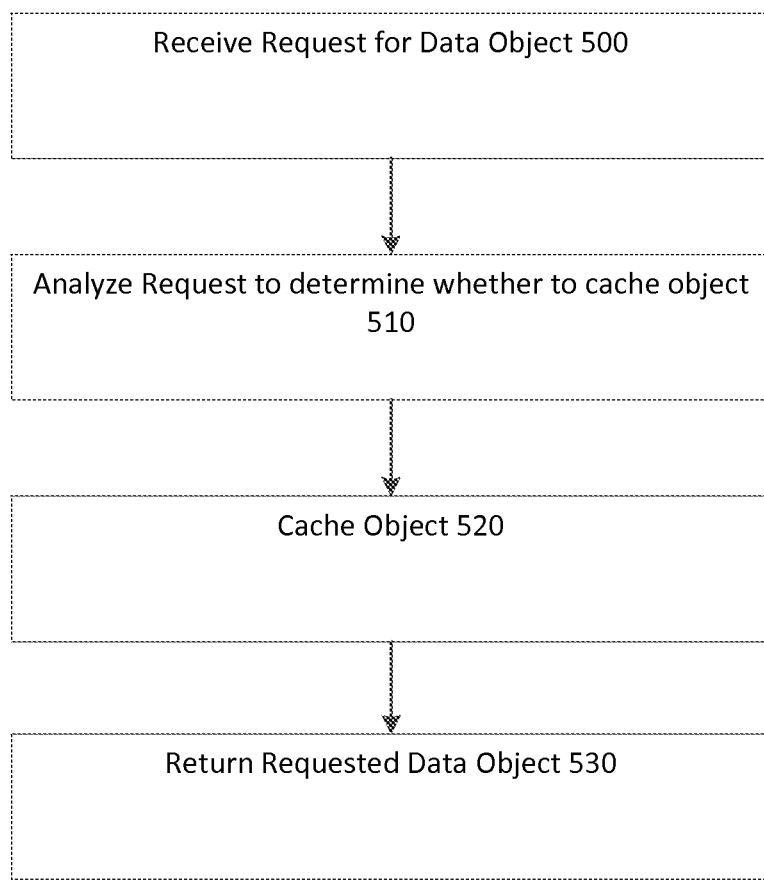
FIG. 5 is a simplified flowchart of a method of providing data services from the system shown in FIG. 3, in accordance with an embodiment of the present disclosure.

Refer to the example embodiments of FIGS. 3 and 5. FIG. 5 is a simplified flowchart of a method of providing data services from the system shown in FIG. 3, in accordance with an embodiment of the present disclosure. System 200 includes data storage system 210, data storage array 250, and cloud storage provider (CSP) 255. In this embodiment, COSV Layer 215 is configured to optimize data I/Os between Application 205 and object based storage 260 on cloud storage provider 255. Application 205 sends a request for a data object to data storage system 210 in message 305. Data Storage System 210 receives the request in message 305 (Step 500) and forwards the request to COSV Layer 215. Data Services module 225 directs Hardware Interface 235 to send message 310 to retrieve the requested data object from object based storage 260 within cloud storage provider 255. Cloud Storage Provider 255 retrieves the requested data object from object based storage 260 and returns the object to COSV Layer 215 using message 315.

In this embodiment, analysis module 230 analyzes data I/Os from application 205 to determine whether COSV Layer 215 should cache the requested data object (Step 510). Upon a positive determination, analysis module 230 provides a recommendation to cache the requested data object. Upon receiving recommendation, data services module 225 directs hardware interface to send message 320 to data management module 245. In this embodiment, message 320 directs data management to cache the requested data object in cache 240 using message 325 (Step 520). In many embodiments, a COSV Layer may be enabled to direct a data storage system to cache one or more data objects locally. In various embodiments, caching one or more data objects locally may include caching one or more data objects within cache of the data storage system. In certain embodiments, caching one or more data objects locally may include caching one or more data objects within one or more data storage arrays in communication with the data storage system. Upon receipt of requested data object within message 315, COSV Layer 215 provides the requested data object to Application 205 through API 220 using message 330 (Step 530).

Figure 6:
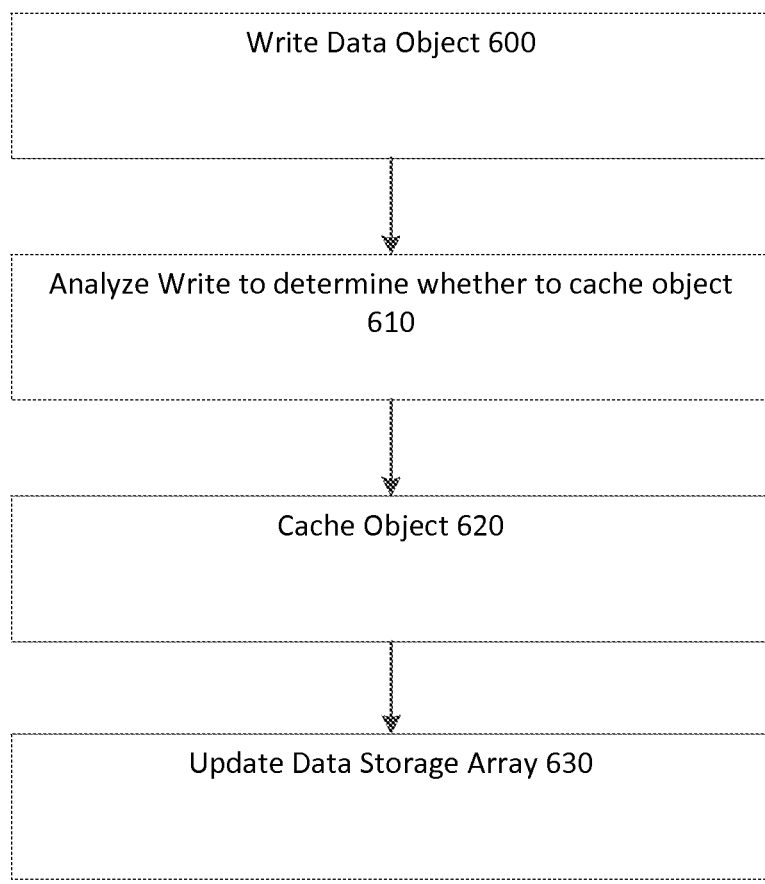
FIG. 6 is an alternate simplified flowchart of a method of providing data services from the system shown in FIG. 3, in accordance with an embodiment of the present disclosure.

Refer to the example embodiments of FIGS. 3 and 6. FIG. 6 is an alternate simplified flowchart of a method of providing data services from the system shown in FIG. 3, in accordance with an embodiment of the present disclosure. As shown in FIG. 3, System 200 includes data storage system 210, data storage array 250, and cloud storage provider (CSP) 255. In this embodiment, COSV Layer 215 is configured to optimize data I/Os between Application 205 and object based storage 260 on cloud storage provider 255. In this embodiment, COSV Layer 215 is configured to optimize data I/Os between Application 205 and object based storage 260 on cloud storage provider 255. Application 205 sends a write data object request to data storage system 210 in message 305. Data Storage System 210 receives the write request in message 305 (Step 600) and forwards the request to COSV Layer 215. Analysis module 230 analyzes data I/Os from application 205 to determine whether COSV Layer 215 should cache the write request for data object (Step 610).

Figure 7:
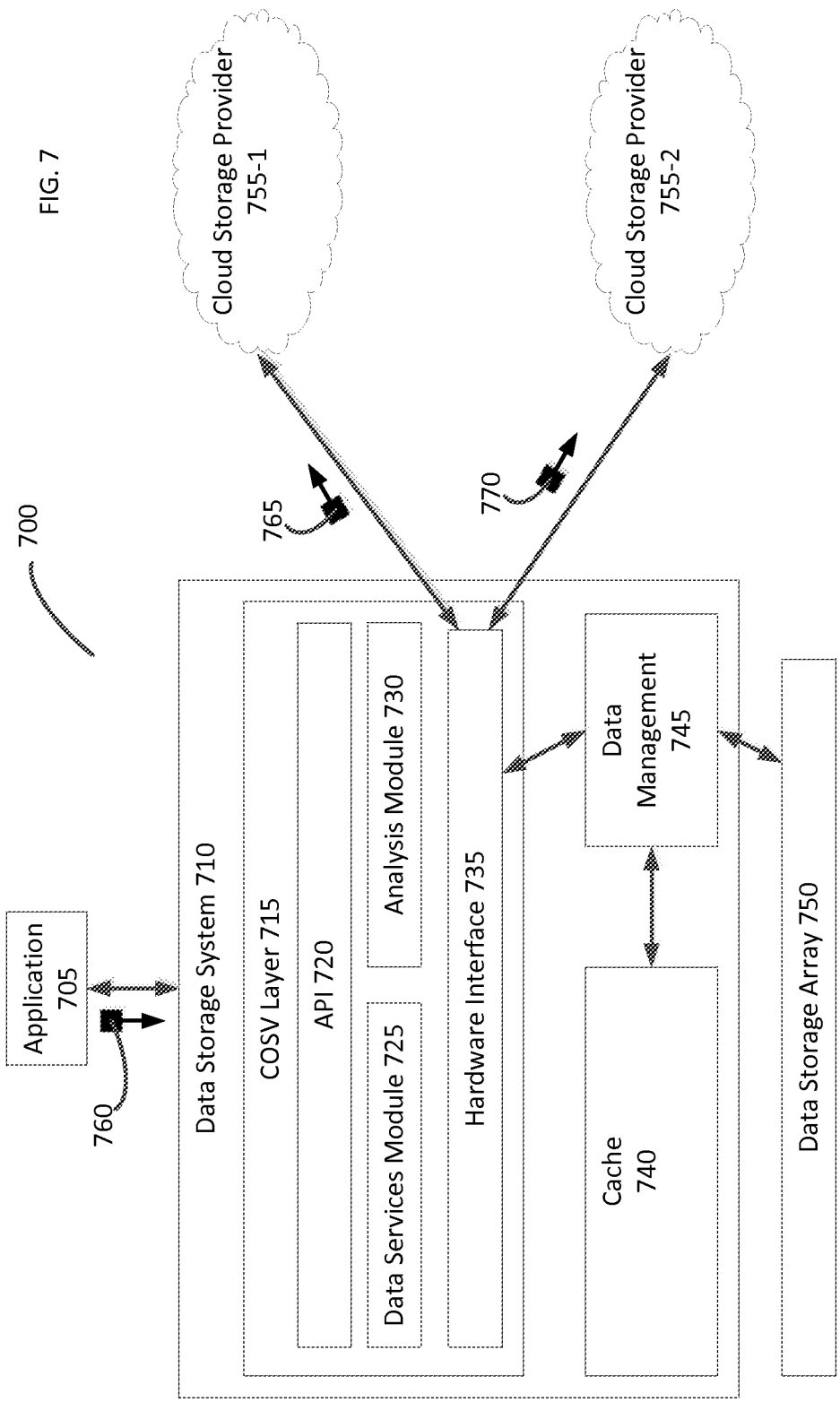
FIG. 7 is a simplified illustration of an implementation of a Cloud Object Store Virtualization Layer in communication with multiple cloud storage providers, in accordance with an embodiment of the present disclosure.

Upon a positive determination, analysis module 230 provides a recommendation to cache the object associated with the write request. Upon receiving recommendation, data services module 225 directs hardware interface to send message 320 to data management module 245. In this embodiment, message 320 directs data management to cache the data object in cache 240 using message 325 (Step 620). In many embodiments, a COSV Layer may be enabled to direct a data storage system to cache one or more data objects locally. In various embodiments, caching one or more data objects locally may include caching one or more data objects within cache of the data storage system. In certain embodiments, caching one or more data objects locally may include caching one or more data objects within one or more data storage arrays in communication with the data storage system. Data services module 225 is enabled to direct hardware interface 235 to send the received write request to cloud storage provider using message 310. In many embodiments, a COSV layer may be enabled to de-stage and/or create copies of data within cache to cloud storage at a later time, such as when a data storage system has excess resources and/or processor time. Refer to the example embodiment of FIG. 7. FIG. 7 is a simplified illustration of an implementation of a Cloud Object Store Virtualization Layer in communication with multiple cloud storage providers, in accordance with an embodiment of the present disclosure. System 700 includes Data Storage System 710, Data Storage Array 750, Cloud Storage Provider 755-1 and Cloud Storage Provider 755-2. Data Storage System 710 includes Cloud Object Store Virtualization (COSV) Layer 715, cache 740, and data management module 745. Data storage system 710 is in communication with data storage array 750, Cloud Storage Provider 755-1 and Cloud Storage Provider 755-2. In this embodiments, the connection between Data Storage System 710 and Cloud Storage Providers (CSP) (755-1 and 755-2, 755 Generally) goes through the internet. COSV Layer 715 includes Application Programming Interface (API) 720, Data Services Module 725, Analysis module 730, and Hardware Interface 735.

In this embodiment, COSV Layer 715 is configured to work with two cloud storage providers, CSP 755-1 and CSP 755-2. In many embodiments, a COSV Layer may be enabled to communicate and/or utilize one or more multiple cloud storage providers. In various embodiments, a COSV Layer may be enabled to provide an Application and/or user with a standard interface to one or more multiple cloud storage providers that do not have a standard and/or similar interface to other cloud storage providers. In certain embodiments, an application and/or user of a COSV Layer may be enabled to use the same interface even when the underlying cloud storage providers or object store implementations may change.

As shown, Application 705 is enabled to send Data I/Os to data storage system 710 using message 760. In many embodiments, a Data I/O may include a complete data object, one or more portions of one or multiple data objects, a request for one or multiple data objects, and/or a request for one or multiple portions of one or multiple data objects. API 720, which is within COSV Layer 715 in Data storage system 710, is enabled to receive message 760 and direct message 760 towards data services module 725. Data Services Module 725 is enabled to manage each received data I/O based on an initial configuration. In this embodiment, system 700 is configured to split stored data objects between Cloud Storage Provider 755-1 and cloud storage provider 755-2.

Figure 8:
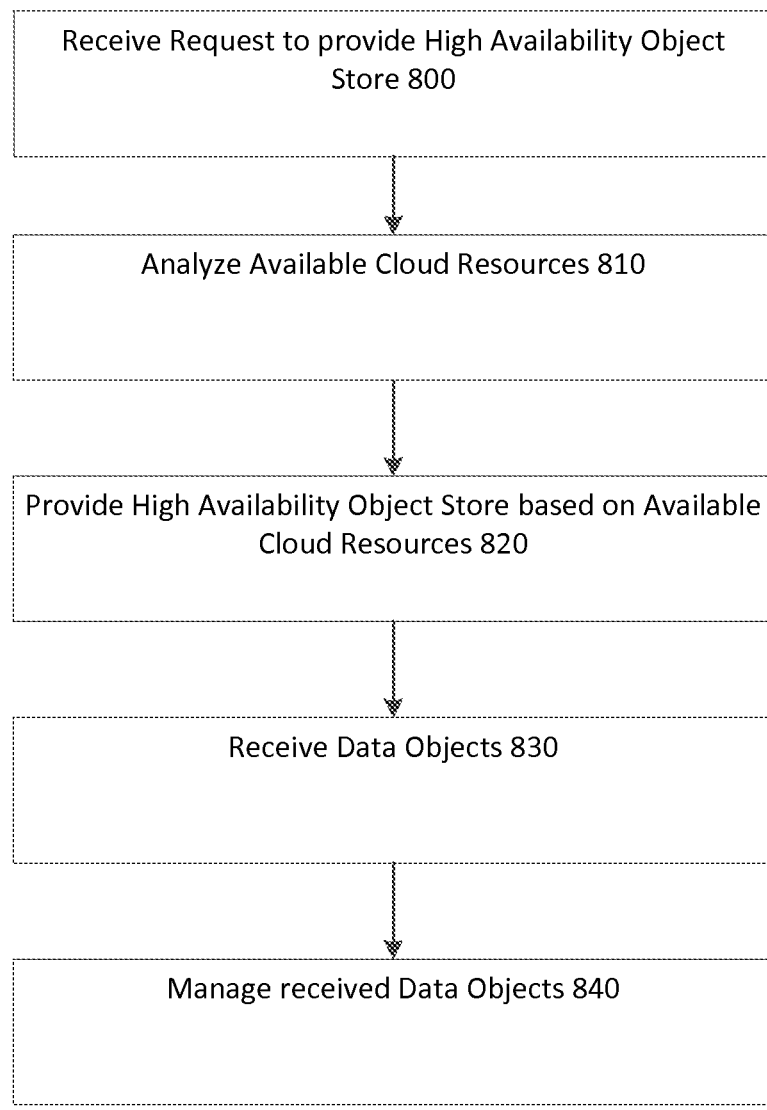
FIG. 8 is a simplified flowchart of a method of managing data I/Os in the system shown in FIG. 7, in accordance with an embodiment of the present disclosure.

Refer to the example embodiments of FIGS. 7 and 8. FIG. 8 is a simplified flowchart of a method of managing data I/Os in the system shown in FIG. 7, in accordance with an embodiment of the present disclosure. As shown in FIG. 7, System 700 includes Data Storage System 710, Data Storage Array 750, Cloud Storage Provider 755-1 and Cloud Storage Provider 755-2. Data Storage System 710 receives a request from application 705 to provide high availability object store (Step 800). Analysis module 730 analyzes available resources, which includes cloud storage provider 755-1, cloud storage provider 755-2, cache 740, and data storage array 750 (Step 810). Analysis module 730 determines that high availability object store can be provided using both Cloud storage Provider 755-1 and cloud storage provider 755-2. Data Services Module 725 provides high availability object store based on available cloud resources (Step 820). COSV Layer 715, within Data Storage System 710, receives data I/Os from application 705 in message 760. (Step 830). Data Services Module 725 within COSV Layer 715 manages received data I/Os in message 760 (Step 830). Data Services Module 725 routes data I/Os within message 760 through hardware Interface 735 to cloud storage Provider 755-1 and cloud storage provider 755-2 using message 765 and 770. In this embodiment, data Services Module 725 creates a primary object store at cloud storage provider 755-1 and a secondary object store at cloud storage provider 755-2, thereby creating a higher availability object store than if application 715 had a single object store at a single cloud storage provider.

Figure 9:
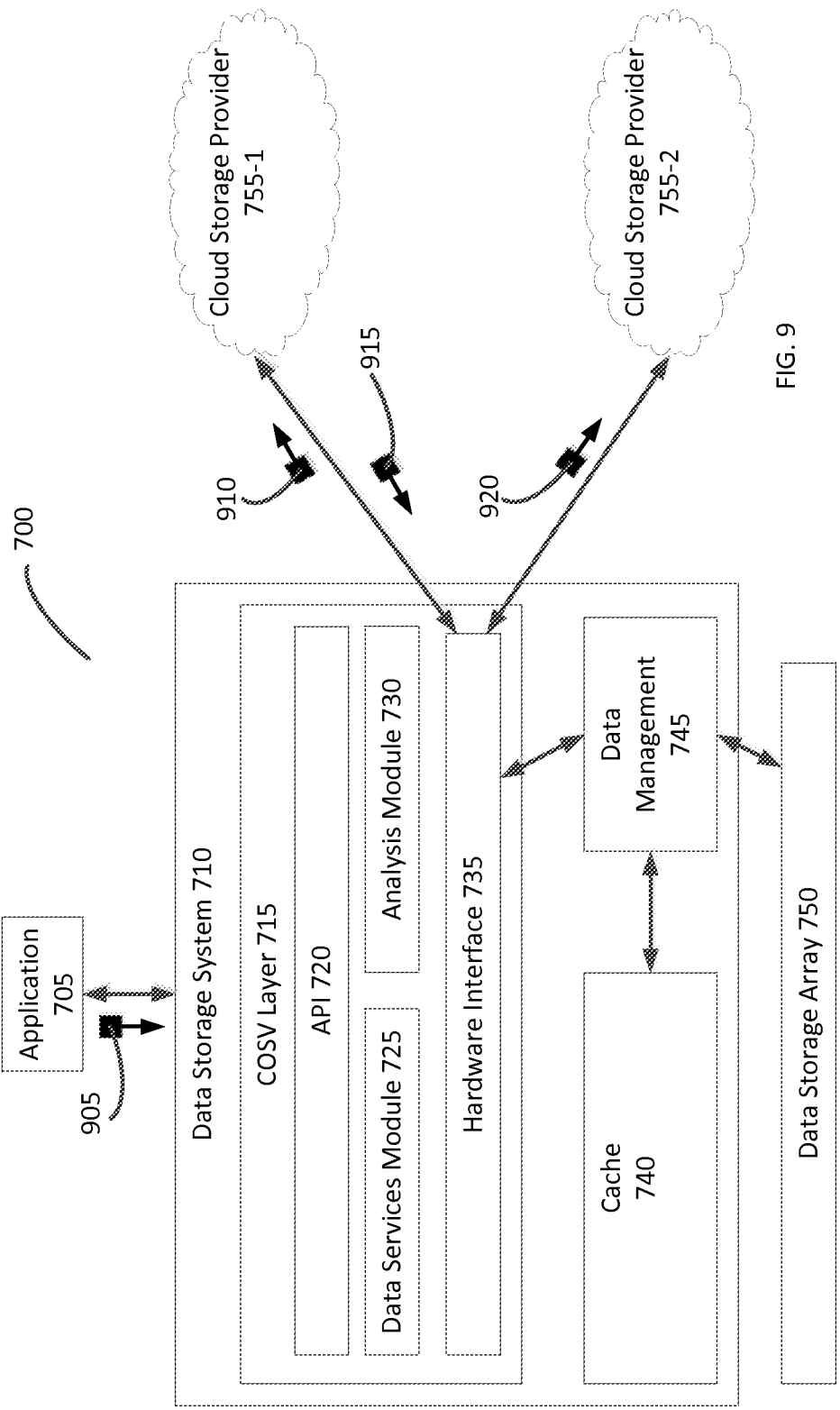
FIG. 9 is an alternate simplified illustration of an implementation of a Cloud Object Store Virtualization Layer in communication with multiple cloud storage providers, in accordance with an embodiment of the present disclosure.

Refer to the example embodiment of FIG. 9. FIG. 9 is an alternate simplified illustration of an implementation of a Cloud Object Store Virtualization Layer in communication with multiple cloud storage providers, in accordance with an embodiment of the present disclosure. System 700 includes Data Storage System 710, Data Storage Array 750, Cloud Storage Provider 755-1 and Cloud Storage Provider 755-2. Data Storage System 710 includes Cloud Object Store Virtualization (COSV) Layer 715, cache 740, and data management module 745. In this embodiment, COSV Layer 715 is configured with a first object store within Cloud Storage Provider 755-1. Application 705 is enabled to request for migration of data stored within Cloud Storage Provider 755-1 to be migrated to cloud storage provider 755-2. In many embodiments, a COSV Layer may be enabled to migrate data from one or multiple cloud storage providers to one or multiple storage providers without interrupting an application's use of one or more cloud storage providers.

In this embodiment, once a migration has been initiated, Application 705 is enabled to utilize an object store accessible through data storage system 710 without interruption of service. COSV Layer 715 is enabled to slowly update the new object store within cloud storage provider 755-2 as COSV Layer 715 receives data I/Os from application 705. Upon receiving a new data object, COSV Layer 715 is enabled to create and/or update the received data object at cloud storage provider 755-2 using message 920. Upon receiving an update to an existing data object, COSV Layer 715 is enabled to retrieve the data object from Cloud Storage Provider 755-1 and create the updated data object within cloud storage provider 755-2. In the background, while data storage system 710 is under lighter workloads, COSV layer 715 is enabled to migrate data from Cloud Storage Provider 755-1 to Cloud Storage Provider 755-2.

Figure 10:
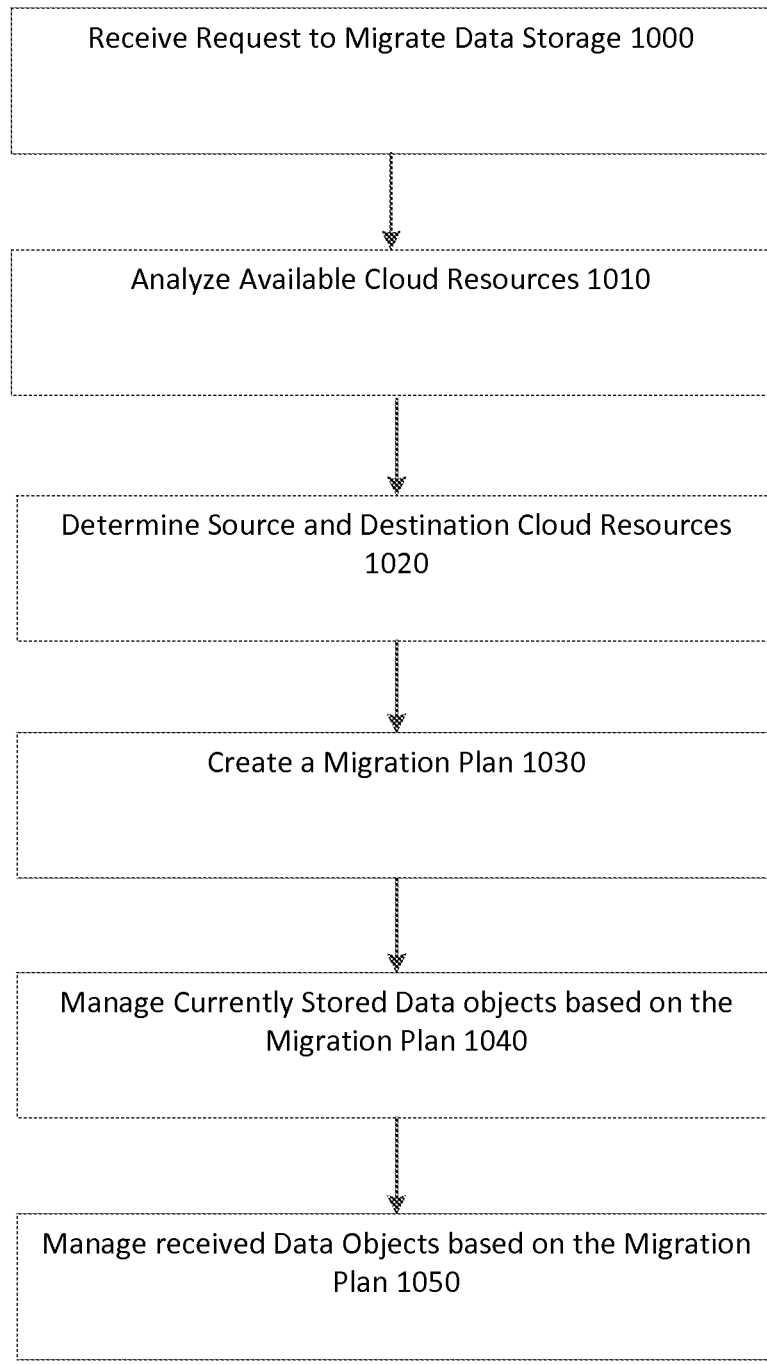
FIG. 10 is a simplified flowchart of a COSV Layer migrating data from a first cloud storage provider to a second cloud storage provider, in accordance with an embodiment of the present disclosure.

Refer to the example embodiments of FIGS. 9 and 10. FIG. 10 is a simplified flowchart of a COSV Layer migrating data from a first cloud storage provider to a second cloud storage provider, in accordance with an embodiment of the present disclosure. As shown in FIG. 9, System 700 includes Data Storage System 710, Data Storage Array 750, Cloud Storage Provider 755-1 and Cloud Storage Provider 755-2. Data Storage System 710 includes Cloud Object Store Virtualization (COSV) Layer 715, cache 740, and data management module 745. COSV Layer 715 receives a request to migrate data storage from Cloud Storage Provider 755-1 to Cloud Storage Provider 755-2 (Step 1000). COSV Layer 715 directs analysis module 730 to analyze available cloud resources (Step 1010). Analysis Module 730 determines the source and destination cloud resources based on the request (Step 1020). Analysis module 730 creates a migration plan (Step 1030) outlining how COSV Layer 715 will manage currently stored data within cloud storage provider 755-1 and new object storage within cloud storage provider 755-2. Analysis module 730 updates data serves module 725 with the migration plan. Data Services Module 725 manages currently stored data objects based on the migration plan (Step 1040).

In the background, data services module 725 uses hardware interface 735 to send message 910 requesting one or multiple data objects from cloud storage provider 755-1 and then removing the one or multiple data objects from cloud storage provider 755-1. Cloud storage Provider 755-1 returns the requested data objects in message 915 and then removes the requested data objects from its object storage. Data services module 725 sends the received data objects in message 915 to cloud storage provider 755-2 to be stored. Data Services Module 725 keeps track of the status of each currently stored data object. In many embodiments, a status may include, but is not limited to, the current location, whether a data object has been updated, whether a data object is currently part of a migration effort, and whether a data object has been cached.

Data Services module 725 manages received data objects based on the migration plan (Step 1050). When COSV Layer 715 receives a data I/O from application 705, COSV Layer 715 updates cloud storage provider 755-2 using message 920. If a received data I/O is an update to an already existing data object currently stored on cloud storage provider 755-1, data services module 725 retrieves the existing data object, updates the existing data object, and then creates the updated existing object in cloud storage provider 755-2.

Figure 11:
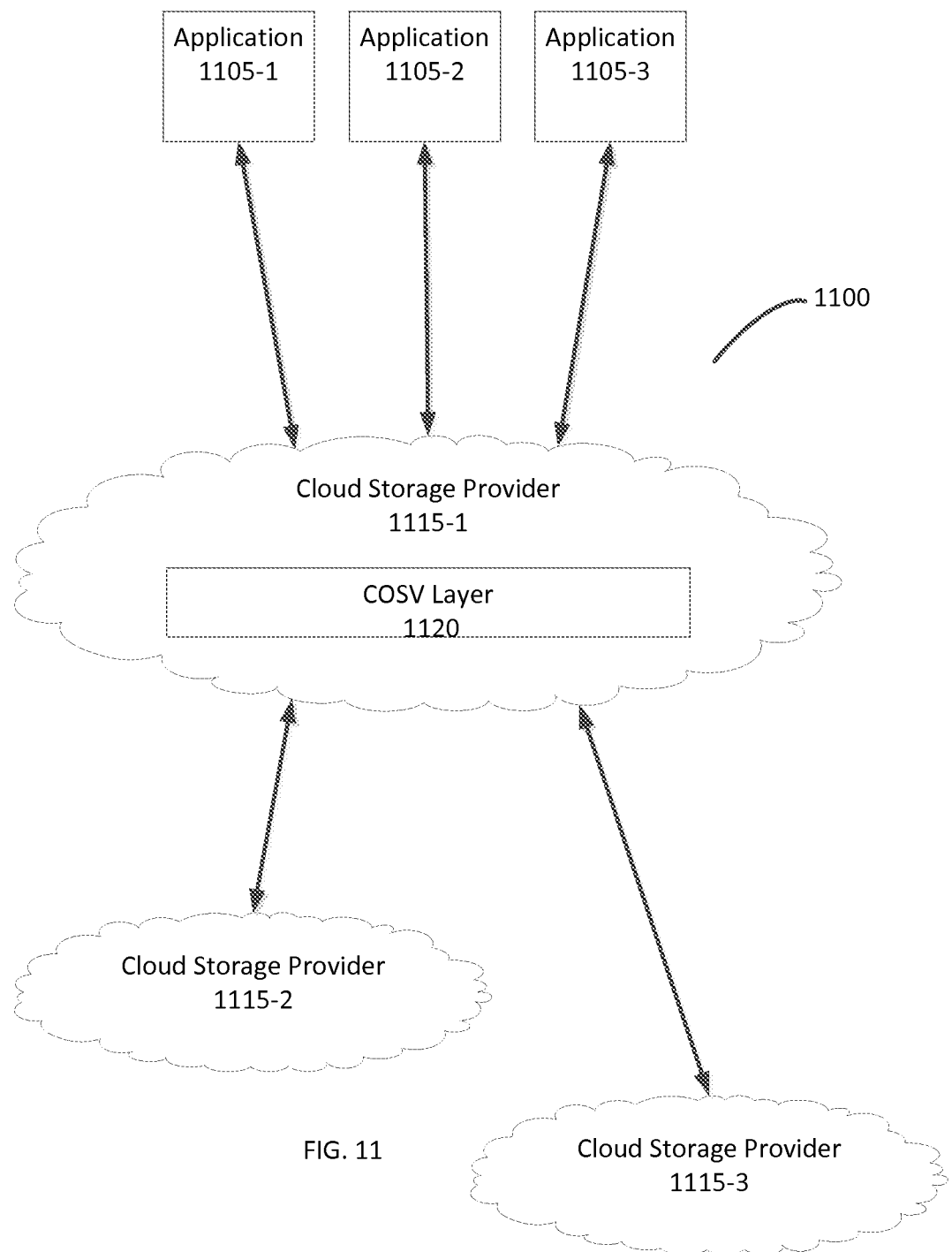
FIG. 11 is a further alternative embodiment of a COSV Layer implemented within a system in communication with a first cloud storage provider and a second cloud storage provider, in accordance with an embodiment of the present disclosure.

Refer to the example embodiment of FIG. 11. FIG. 11 is a further alternative embodiment of a COSV Layer implemented within a system in communication with a first cloud storage provider and a second cloud storage provider, in accordance with an embodiment of the present disclosure. System 1100 includes Cloud Storage Provider 1115-1, cloud storage provider 1115-2, and cloud storage provider 1115-3. In this embodiment, COSV Layer is implemented within cloud storage provider 1115-1. COSV Layer 1120 is enabled to communicate with Cloud storage provider 1115-2 and cloud storage provider 1115-3. COSV Layer 1120 is enabled to interact with object based storage on Cloud Storage Provider 1115-1, cloud storage provider 1115-2, and cloud storage provider 1115-3.

In this embodiment, Application 1105-1, application 1105-2, and application 1105-3 are in communication with cloud storage provider 1115-1 Each of Applications (1105-1, 1105-2, 1105-3) are enabled to use COSV Layer 1120 to manage object based storage on any of Cloud Storage Provider 1115-1, cloud storage provider 1115-2, and cloud storage provider 1115-3. In certain embodiments, a COSV Layer may or may not be in communication with a data storage array. In some embodiments, a cloud storage provider may be enabled to provide an implementation of a COSV Layer. In various embodiments, a cloud storage provider implementing a COSV Layer may be enabled to provide access to object stores on other cloud storage providers.

Multi Point in Time Object Store

In many embodiments, the current disclosure may enable a Cloud Object Store Virtualization (COSV) layer to provide a user, administrator and/or applications multi point in time object store capability. In various embodiments, the current disclosure may enable an application, user and/or administrator to recover from corrupt information. In certain embodiments, the current disclosure may enable an application, user, and/or administrator to run analysis on particular points in time. In other embodiments, the current disclosure may enable an application, user and/or administrator to utilize a point in time of an object store as a target for business continuity replication systems. In most embodiments, a multi point in time object store capability may enable creation of a snapshot of a system over an object store. In some embodiments, the current disclosure may enable management of an object store with multi point in time object store capability while not disruptive active data services.

In various embodiments, multi point in time object store capability may allow accessing different points in time of an object store. In certain embodiments, a COSV Layer may enable use of a multi point in time object store capability. In some embodiments, a COSV Layer may create an ordered stream of keys. In most embodiments, an ordered stream of keys may be used to keep track of which objects existed at which point in time. In various embodiments, as new data objects, and their associated keys arrive, new keys may be added to the stream. In certain embodiments, when a data I/O is received deleting a key, a deleted key may be marked as deleted in the stream, but the object in the object store may not be deleted. In some embodiments, objects marked as deleted may be renamed and/or time stamped to specify when the marked as deleted object was designated to be deleted by the Object Store. In other embodiments, updated keys may be added to the stream and the existing object key may be renamed to contain an incrementing version number, such as, but not limited to, index or timestamp. Then, as in many embodiments, an object update may be placed in the object store as a new object.

In many embodiments, a COSV Layer may be enabled to expose a Point in Time endpoint to a Cloud Object Store together with an unrelated Point in Time of a volume accessible by the COSV Layer. In various embodiments, a COSV Layer may be enabled to combine and/or create a cross media Point in Time from a Point in Time endpoint to a cloud object store and an unrelated Point in Time of a volume accessible by the COSV Layer.

In most embodiments, a COSV Layer may be enabled to scan and/or analyze the stream to have a complete view of what keys existed in an object store at any Point in Time. In various embodiments, Objects that existed and were modified at some time in the past may have their data stored using renamed keys. In certain embodiments, a COSV Layer may be enabled to utilize the stream to track renamed keys to provide a requested version of one or multiple objects.

In many embodiments, all or a portion of the stream may be implemented as a volume, database, and/or any other persistent storage. In various embodiments, the size of the stream may be proportional to the total key sizes (including versions) and not the object data size. In certain embodiments, a COSV Layer may be enabled to present multiple Points in Time of an object store while still updating the stream and tables in the background thereby present an effect of a static point in time.

Figure 12:
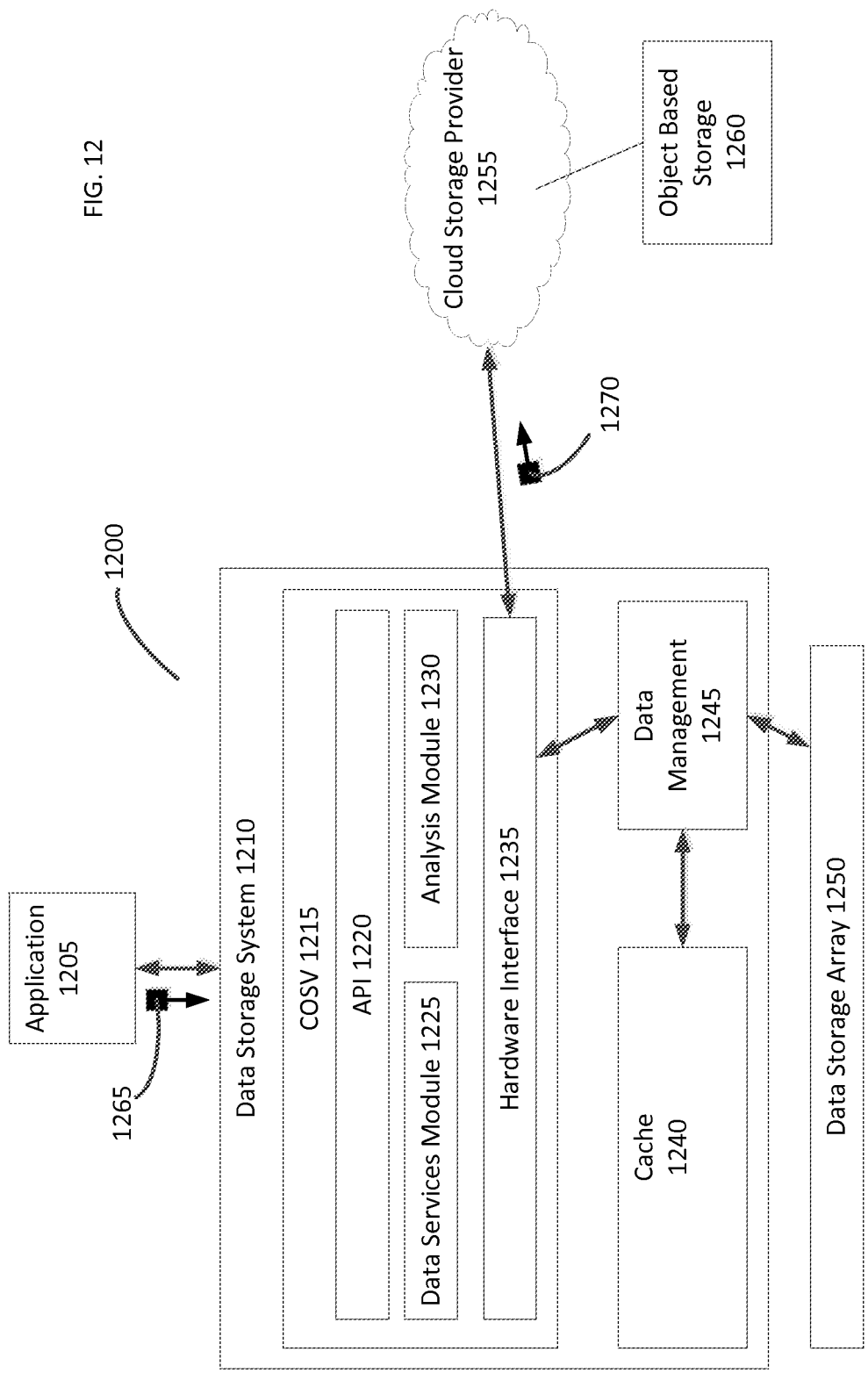
FIG. 12 is a simplified illustration of a COSV Layer interacting with a Cloud Storage Provider, in accordance with an embodiment of the present disclosure.

Refer to the example embodiment of FIG. 12. FIG. 12 is a simplified illustration of a COSV Layer interacting with a Cloud Storage Provider, in accordance with an embodiment of the present disclosure. System 1200 includes data storage system 1210, data storage array 1250, and cloud storage provider 1255. Data storage system 1210 is enabled to communicate with cloud storage provider 1255 using an internet connection. Data Storage system 1210 includes COSV Layer 1215, Data Management module 1245, and cache 1240. COSV Layer 1215 includes Application Programming Interface (API) 1220, data services module 1225, analysis module 1230, and hardware interface 1235. Hardware interface is enabled to communicate with cloud storage provider 1255 and data management module 1245. Data management module 1245 enables management of cache 1240 and data storage array 1250. As shown, cloud storage provider 1255 includes object based storage 1260.

In this embodiment, Application 1205 is enabled to send data I/Os to data storage system 1210 using message 1265. COSV Layer 1215 is enabled to update object based storage 1260 within cloud storage provider 1255 using message 1270. Data storage system 1210 is enabled to provide a virtual and/or real image of data at a specified point in time of object based storage 1260 using COSV Layer 1215. COSV Layer 1215 is enabled to manage versions of data and/or data objects within object based storage 1260. COSV Layer 1215 is enabled to create one or more virtual object stores based on object based storage 1260. COSV Layer 1215 is enabled to create one or more object stores based on object based storage 1260. In this embodiment, COSV Layer 1215 is enabled to create a stream of keys for managing versions of objects stored in object based storage 1260.

Figure 13:
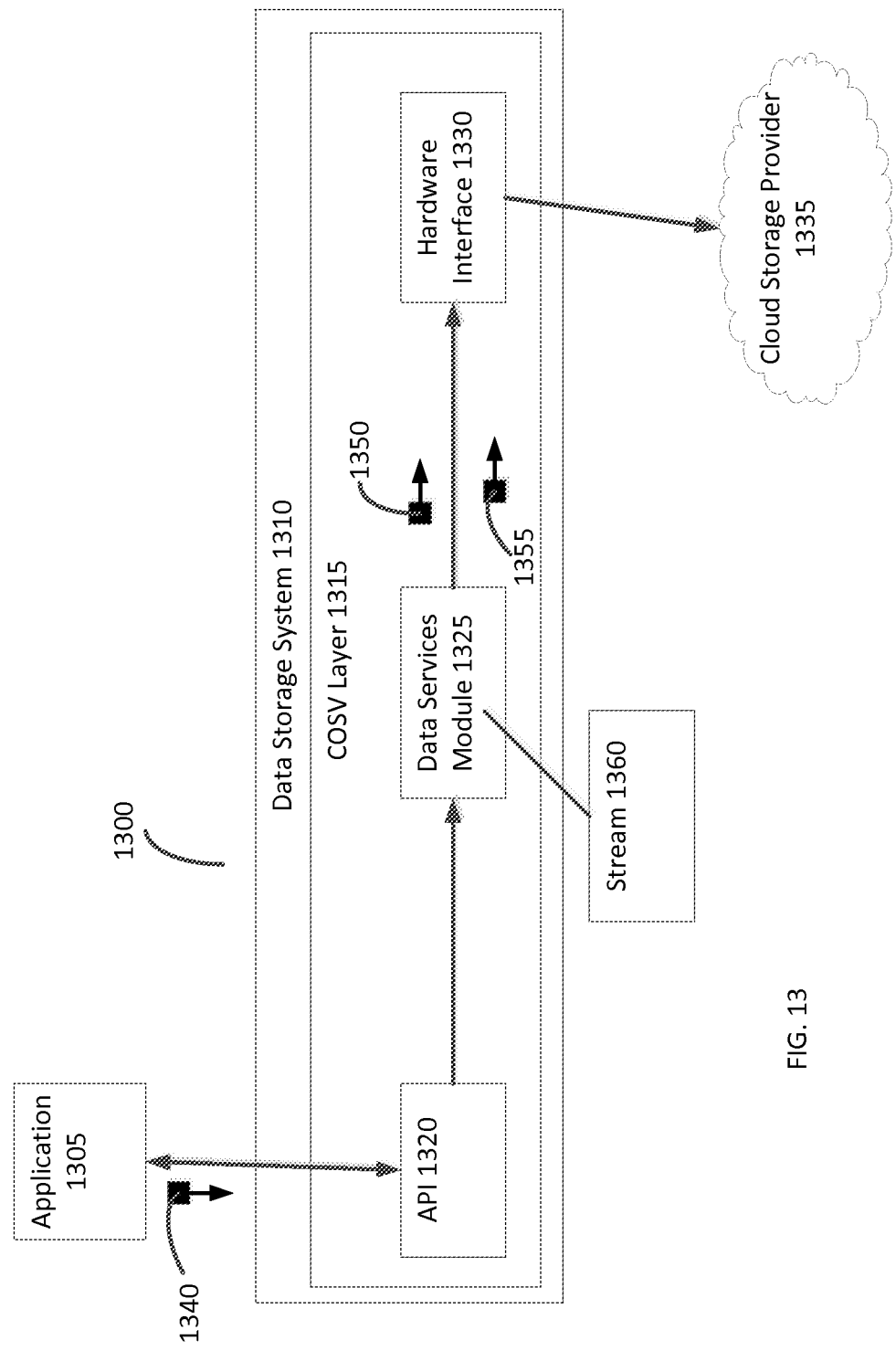
FIG. 13 is a simplified illustration of a data storage system managing a multi point in time object store, in accordance with an embodiment of the present disclosure.

Refer to the example embodiment of FIG. 13. FIG. 13 is a simplified illustration of a data storage system managing a multi point in time object store, in accordance with an embodiment of the present disclosure. System 1300 includes data storage system 1310. Data storage system 1310 is in communication with cloud storage provider 1335. Application 1305 is enabled to send a data I/O to data storage system 1310 in message 1340. API 1320 within COSV Layer 1315 is enabled to receive message 1340. API 1320 is enabled to forward message 1340 to data services module 1325. Data Services module 1325 is enabled to determine whether the information in within message 1340 relates to a new data object or a currently stored data object. Data Services module 1325 contains stream 1360 which enables management of versioning of objects stored within cloud storage provider 1335.

When data services module 1325 receives message 1340, data services module 1325 is enable to use stream 1360 to determine whether message relates to a new data object or an existing data object. If a received message 1340 relates to a new data object, data services module 1325 is enabled to update stream 1360 with a new key for the new data object. Data services module 1325 is enabled to send message 1355 to hardware interface 1330 to direct hardware interface 1330 to create a new data object related to message 1340 and key stored in stream 1360. If a received message 1340 relates to a currently stored data object, data services module 1325 is enabled to modify the existing key within stream 1360 to specify at what time the associated object was modified. Data services module 1325 is enabled to send message 1350 to hardware interface 1330 to direct hardware interface 1330 to update the currently stored data object in cloud storage provider 1335 to reflect the updated key.

Upon completion of action related to message 1350, data service module 1325 is enabled to send message 1355 to hardware interface 1330 to direct hardware interface 1330 to create a data object within cloud storage provider 1335 which includes the updates within message 1340. Data service module 1325 updates the key in stream 1360 such that Application 1305 will not know that the original key and associated data object has changed for versioning purposes. Messages 1350 and 1355 enable data services module 1325 to store both current and previous versions of data objects within cloud storage provider 1335. Data services module 1325 is enabled to modify keys within stream 1360 to distinguish a current data object with a previous version of a data object. Data Services Module 1325 is enabled to modify objects within cloud storage provider to 1335 to associate the proper key in stream 1360 with the proper object in cloud storage provider 1335. Data services module 1325 is enabled to determine which data objects within cloud storage provider 1335 existed at any point in time when the multi point in time object store ability was active.

Figure 14:
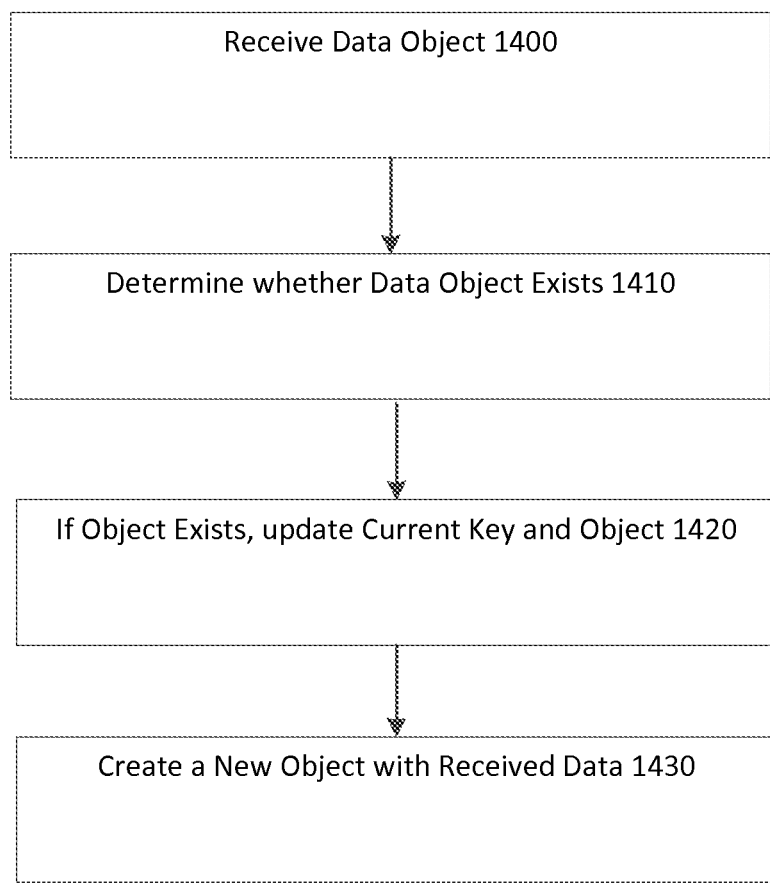
FIG. 14 is a simplified flowchart of a method of managing versioned data objects within the system described in FIG. 13, in accordance with an embodiment of the present disclosure.

Refer to the example embodiments of FIGS. 13 and 14. FIG. 14 is a simplified flowchart of a method of managing versioned data objects within the system described in FIG. 13, in accordance with an embodiment of the present disclosure. In FIG. 13, System 1300 includes data storage system 1310. Data storage system 1310 is in communication with cloud storage provider 1335. API 1320 receives a data object update in message 1340 from application 1305 (Step 1400). API 1320 forwards message information in message 1340 to data services module 1325. Data services module 1325 queries stream 1360 to determine whether the data object related to message 1340 exists (Step 1410). If the data object related to message 1340 exists, data services module 1325 updates the key of the existing data object in stream 1360 to reflect at what time the existing object was changed. Data services module 1325 utilizes message 1350 to update the existing data object with the changed key information (Step 1420). In some embodiments, a data services module may be enabled to modify a data object to include information related to when the data object was modified. If no data object related to message 1340 exists, or after the current data object has been updated, Data Services module 1325 sends message 1355 to create a new data object and associated key within the object store within cloud storage provider 1335. Data services module 1325 updates stream 1360 with the associated key. In this embodiment, an updated data object that replaces a previous data object shall appear to application 1305 as though the previous object still exists with the updated information originally sent in message 1340.

Figure 15:
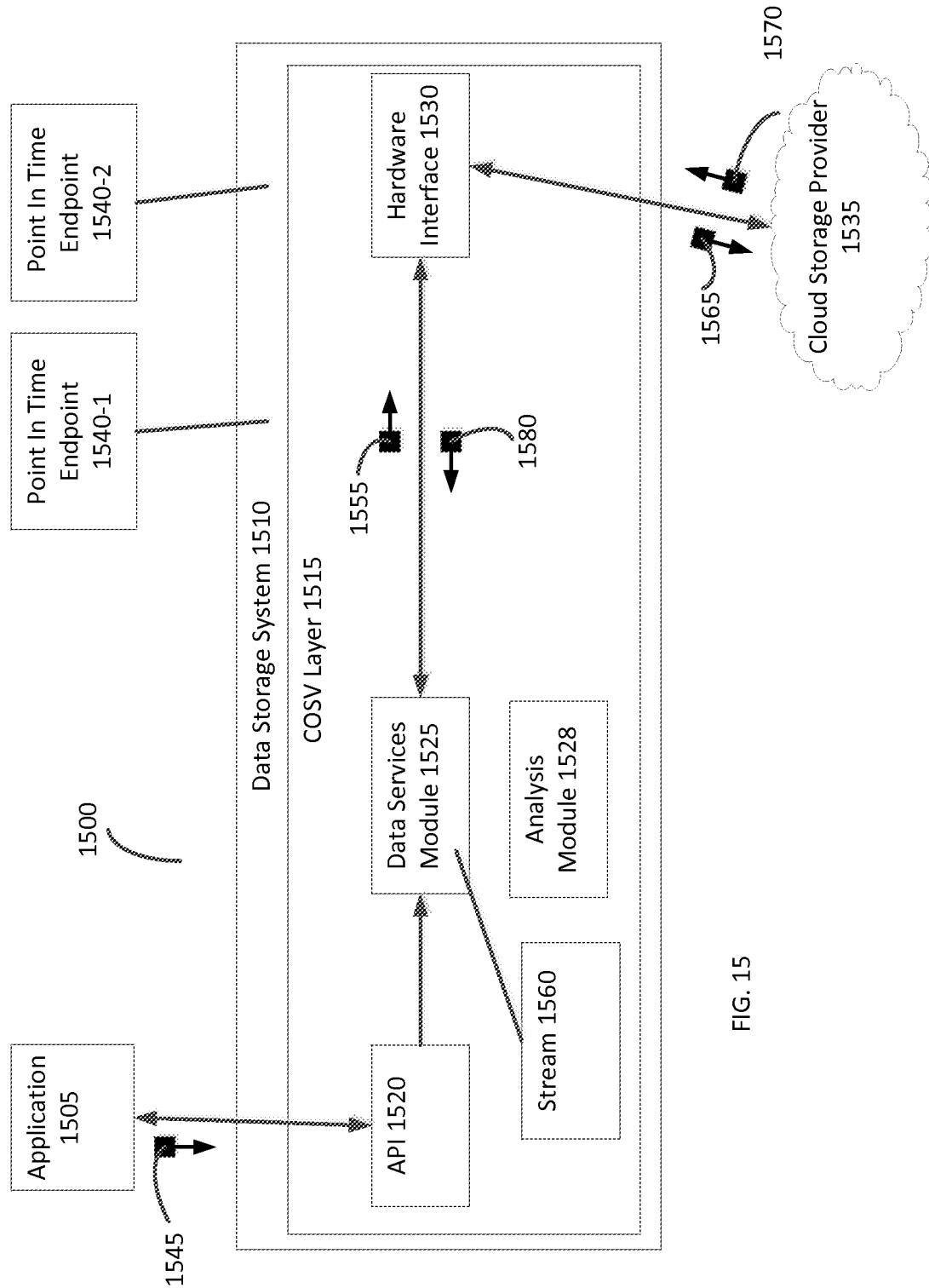
FIG. 15 is a simplified illustration of a Cloud Object Store Virtualization (COSV) Layer providing a snapshot from data objects stored within a cloud storage provider, in accordance with an embodiment of the present disclosure.

Refer to the example embodiment of FIG. 15. FIG. 15 is a simplified illustration of a Cloud Object Store Virtualization (COSV) Layer providing a snapshot from data objects stored within a cloud storage provider, in accordance with an embodiment of the present disclosure. As shown, system 1500 includes data storage system 1510 and cloud storage provider 1535. In this embodiment, Application 1505 is enabled to request a snapshot of data objects from cloud storage provider 1535 using message 1545. API 1520 is enabled to forward message 1545 to data services module 1525. Data Services Module 1525 is enabled to direct analysis module 1528, to determine which objects stored within cloud storage provider 1535 existed during the timeframe referenced in message 1545. Analysis module 1528 is enabled to analyze stream 1560 to make a determination as to which object existed during a specified timeframe. Based on a determination from analysis module 1528, Data Services module 1525 is enabled to make a request for information relating to data objects within cloud storage provider 1535 using message 1555. Hardware Interface 1530 is enabled to use message 1555 to request information from cloud storage provider 1535 utilizing message 1565. Cloud storage provider 1535 is enabled to utilize message 1565 to query its object store to determine which portions of information are being requested and respond using message 1570. Hardware interface 1530 is enabled to respond using message 1580 by using information in message 1570.

In many embodiments, a data services module may be enabled to determine whether or not one or multiple data objects existed during a specified timeframe. In various embodiments, a timeframe may include before a specified time, after a specified time, between two specified times, and/or portions of time during the existence of an object store within a cloud storage provider. In certain embodiments, a data services module may be enabled to provide an endpoint to a cloud object store to provide an application and/or a user access to data objects within a cloud storage provider during a specified timeframe. In some embodiments, a virtual volume may be a volume that contains references to data objects within a cloud storage provider. In other embodiments a volume may be a copy of data objects from a cloud storage provider that existed during a specified timeframe. In most embodiments, a COSV Layer may be enabled to provide one or multiple virtual volumes and/or volumes. In various embodiments, a virtual volume and/or volume may be provided to an application and/or user in various forms including, but not limited to, a Logical Unit (LU), snapshot, and/or other data storage that a person of ordinary skill in the art would recognize as being able to provide access to one or multiple data objects from an object store.

Figure 16:
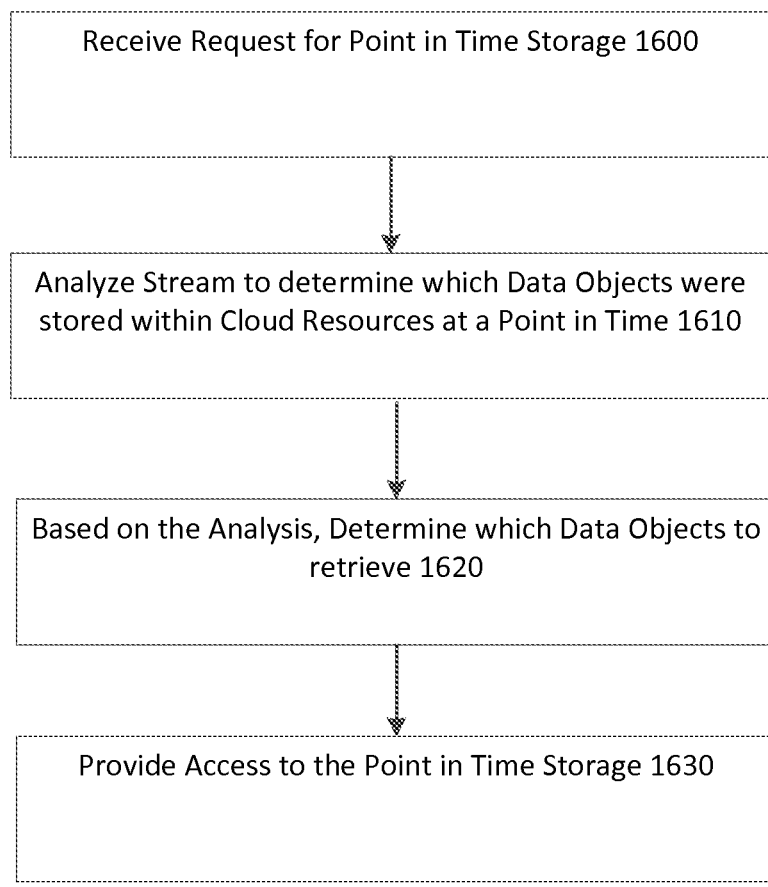
FIG. 16 is a simplified flowchart of a method of retrieving a snapshot of a point in time of an object store of the system shown in FIG. 15, in accordance with an embodiment of the present disclosure.

Refer to the example embodiments of FIGS. 15 and 16. FIG. 16 is a simplified flowchart of a method of retrieving a snapshot of a point in time of an object store of the system shown in FIG. 15, in accordance with an embodiment of the present disclosure. FIG. 15 shows that system 1500 includes data storage system 1510 and cloud storage provider 1535. API 1520 receives message 1545 from application 1505 (Step 1600). Message 1545 contains a request for point in time storage at Time A and Time B. API 1520 forwards request to data services module 1525. Data services module 1525 directs analysis module 1528 to analyze stream 1560 to determine which data objects were stored within Cloud Storage Provider 1535 at Time A and Time B (Step 1610). Based on the analysis, analysis module determines which portions of the object store within Cloud Storage provider 1535 should be retrieved (Step 1620). Data services module 1525 sends message 1555 requesting that Hardware interface 1530 request for the portions of data associated with Time A and Time B. Hardware Interface 1530 requests for the data using message 1565. Cloud storage provider 1535 retrieves requested data from object store and responds to request in message 1570. Hardware interface 1530 returns retrieved information in message 1580. In this embodiment, data service module 1525 utilizes resources of data storage system 1510 to provide Point in Time access to portions of object store of cloud storage provider 1535 for Time A and Time B (Step 1630). As shown, Point in Time endpoint 1540-1 references the data objects that existed at Time A in the object store of cloud storage provider 1535. Point in Time endpoint 1540-2 references data objects that existed at Time B in the object store of cloud storage provider 1535. In many embodiments, a COSV Layer may be enabled to provide an endpoint, volume, and/or virtual volume that may include copies and/or references to data objects stored in an object store within a cloud storage provider.

In many embodiments, a COSV Layer may provide one or multiple Point in Time volumes based on data objects stored within a cloud storage provider's object store. In various embodiments, a point in time volume may be a virtual volume containing references to objects within an object store. In certain embodiments, a point in time volume may be an actual volume with copies of data objects from an object store. In most embodiments, a point in time volume may be accessed by one or multiple applications. In various embodiments, a point in time volume may be accessed by one or multiple users and/or administrators. In certain embodiments, a point in time volume may be accessed by one or multiple applications, users, and/or administrators concurrently.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 17:
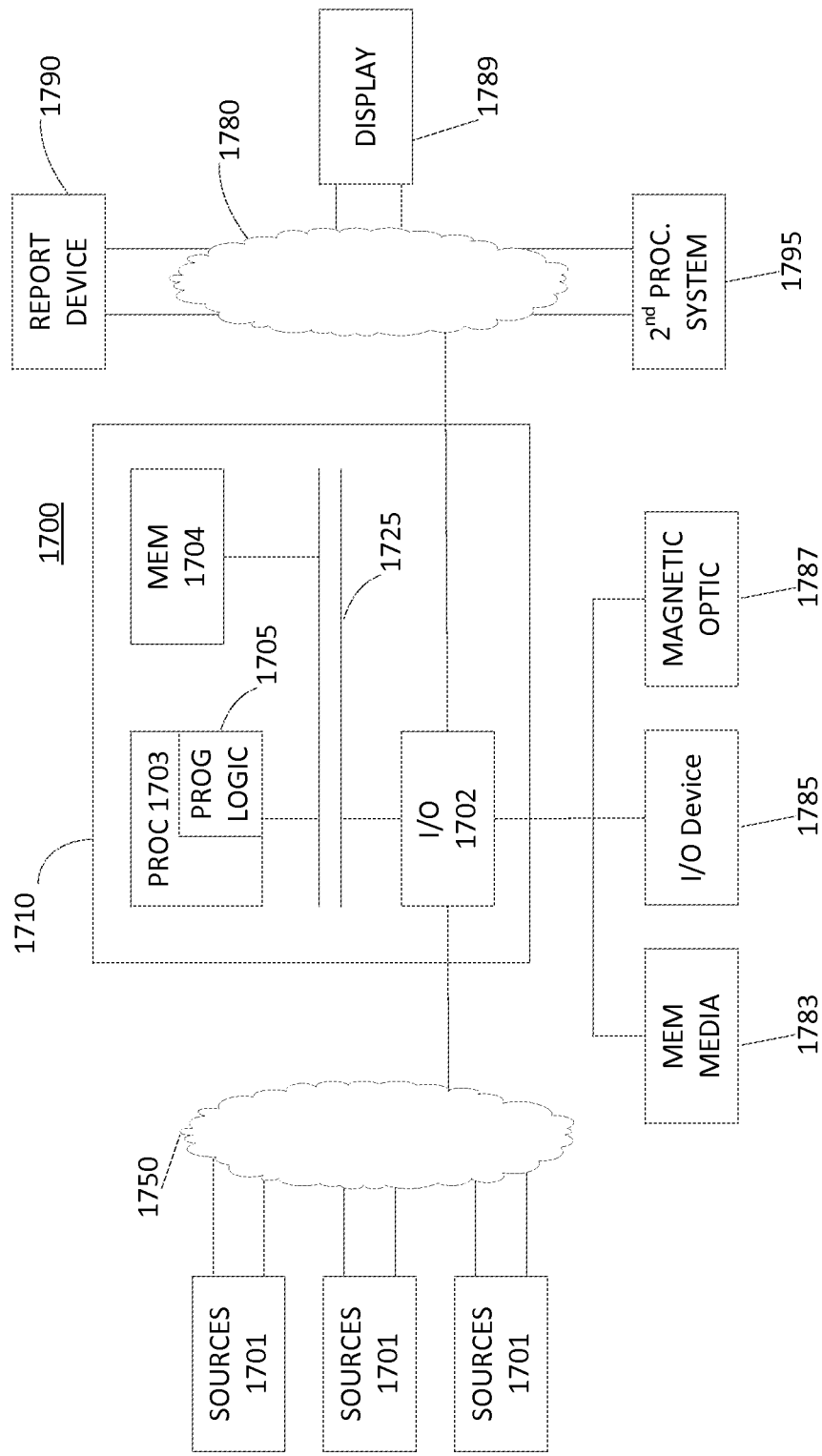
FIG. 17 is an example of an embodiment of an apparatus that may utilize the techniques described herein, in accordance with an embodiment of the present disclosure.

FIG. 17 is a block diagram illustrating an apparatus, such as a computer 1710 in a network 1700, which may utilize the techniques described herein according to an example embodiment of the present invention. The computer 1710 may include one or more I/O ports 1702, a processor 1703, and memory 1704, all of which may be connected by an interconnect 1725, such as a bus. Processor 1703 may include program logic 1705. The I/O port 1702 may provide connectivity to memory media 1783, I/O devices 1785, and drives 1787, such as magnetic drives, optical drives, or Solid State Drives (SSD). When the program code is loaded into memory 1704 and executed by the computer 1710, the machine becomes an apparatus for practicing the invention. When implemented on one or more general-purpose processors 1703, the program code combines with such a processor to provide a unique apparatus that operates analogously to specific logic circuits. As such, a general purpose digital machine can be transformed into a special purpose digital machine.

Figure 18:
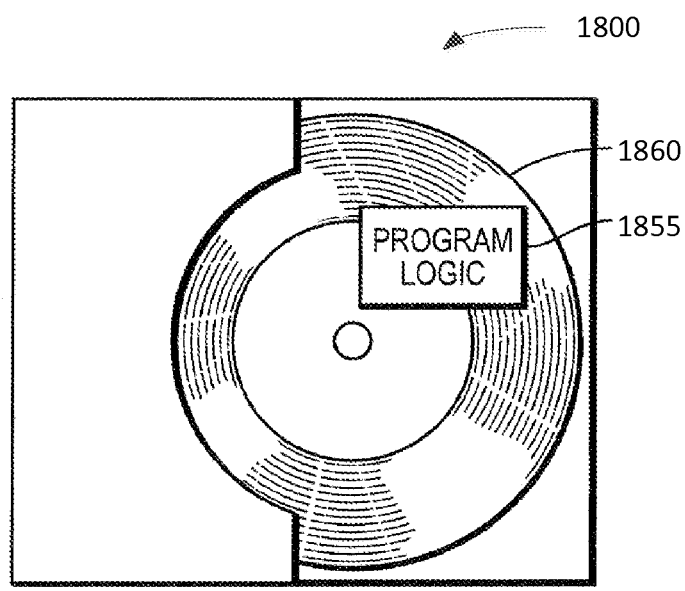
FIG. 18 is an example of a method embodied on a computer readable storage medium that may utilize the techniques described herein, in accordance with an embodiment of the present disclosure.

FIG. 18 is a block diagram illustrating a method embodied on a computer readable storage medium 1860 that may utilize the techniques described herein according to an example embodiment of the present invention. FIG. 18 shows Program Logic 1855 embodied on a computer-readable medium 1860 as shown, and wherein the Logic is encoded in computer-executable code configured for carrying out the methods of this invention and thereby forming a Computer Program Product 1800. Program Logic 1855 may be the same logic 1705 on memory 1704 loaded on processor 1703 in FIG. 17. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-18. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A Computer-executable method for managing an object based storage within a cloud storage provider, the computer-executable method comprising:
   receiving a data object update I/O;
   determining whether the data object update I/O relates to an existing current data object within the object based storage;
   upon determining the data object update I/O relates to the existing current data object, updating an ordered stream of keys and the existing current data object in the object based storage to retain a current and a previous version of the existing current data object, and creating a new data object and key based on the data object update I/O, wherein the result of the updating reflects at what time the existing current data object was changed;
   upon determining the data object update I/O does not relate to the existing current data object, creating a new data object and key based on the data object update I/O, updating the object based storage, and adding the key to the ordered stream of keys;
   receiving a request for a snapshot of the object based storage at a time;
   analyzing the ordered stream of keys to determine which objects within the object based storage existed at the time; and
   providing a snapshot of the object based storage at the time.

2. The computer-executable method of claim 1, wherein determining comprises:
   analyzing the stream, wherein the stream includes keys related to data objects within the object based storage.

3. The computer-executable method of claim 2, wherein the keys included in the stream include information to designate whether each key of the keys, and the associated data object, is current.

4. The computer-executable method of claim 1, wherein the time is a timeframe and the snapshot includes objects existing within the object based storage between two specified times of the timeframe.

5. The computer-executable method of claim 4, wherein analyzing the stream to determine which objects within the object based storage existed at the time comprises:
   identifying a portion of the data objects within the object based storage, the portion corresponding to the existing and current data objects in the object based storage at the time.

6. The Computer-executable method of claim 5, wherein the portion includes data objects with keys marked as deleted in the stream.

7. The computer-executable method of claim 1, further comprising:
   receiving a request to delete a previous data object within the object based storage;
   updating the stream; and
   updating the first data object within the object based storage.

8. The computer-executable method of claim 7, wherein updating the data object comprises:
   designating the previous data object as removed and updating the first data object with a time of removal.

9. A Computer Program Product for managing an object based storage within a cloud storage provider, the computer-executable method comprising:
   a non-transitory computer readable medium encoded with computer-executable code, the code configured to enable the execution of:
   receiving a data object update I/O;
   determining whether the data object update I/O relates to an existing current data object within the object based storage;
   upon determining the data object update I/O relates to the existing current data object, updating an ordered stream of keys and the existing current data object in the object based storage to retain a current and a previous version of the existing current data object, and creating a new data object and key based on the data object update I/O, wherein the result of the updating reflects at what time the existing current data object was changed;
   upon determining the data object update I/O does not relate to the existing current data object, creating a new data object and key based on the data object update I/O, updating the object based storage, and adding the key to the ordered stream of keys;
   receiving a request for a snapshot of the object based storage at a time;
   analyzing the ordered stream of keys to determine which objects within the object based storage existed at the time; and
   providing a snapshot of the object based storage at the time.

10. The Computer program product of claim 9, wherein determining comprises:
    analyzing the stream, wherein the stream includes keys related to data objects within the object based storage.

11. The Computer program product of claim 10, wherein the keys included in the stream include information to designate whether each key of the keys, and the associated data object, is current.

12. The Computer program product of claim 9, wherein the time is a timeframe and the snapshot includes objects existing within the object based storage between two specified times of the timeframe.

13. The Computer program product of claim 9, wherein the code is further configured to enable the execution of:
   receiving a request to delete a previous data object within the object based storage;
   updating the stream; and
   updating the first data object within the object based storage.

14. The computer program product of claim 13, wherein updating the data object comprises:
   designating the previous data object as removed and updating the first data object with a time of removal.

15. A System, comprising:
   a cloud storage provider including an object based storage; and
   computer-executable program logic encoded in memory of one or more computers enabled to manage object based storage, wherein the computer-executable program logic is configured for the execution of:
   receiving a data object update I/O;
   determining the data object update I/O relates to an existing current data object within the object based storage;
   upon determining the data object update I/O relates to the existing current data object, updating an ordered stream of keys and the existing current data object in the object based storage to retain a current and a previous version of the existing current data object, and creating a new data object and key based on the data object update I/O, wherein the result of the updating reflects at what time the existing current data object was changed;
   upon determining the data object update I/O does not relate to the existing current data object, creating a new data object and key based on the data object update I/O, updating the object based storage, and adding the key to the ordered stream of keys;
   receiving a request for a snapshot of the object based storage at a time;
   analyzing the ordered stream of keys to determine which objects within the object based storage existed at the time; and
   providing a snapshot of the object based storage at the time.

16. The system of claim 15, wherein determining comprises:
   analyzing the stream, wherein the stream includes keys related to data objects within the object based storage.

17. The System of claim 16, wherein the keys included in the stream include information to designate whether each key of the keys, and the associated data object, is current.

18. The System of claim 15, wherein the time is a timeframe and the snapshot includes objects existing within the object based storage between two specified times of the timeframe.

19. The System of claim 15, wherein the computer-executable program logic is further configured for the execution of:
   receiving a request to delete a previous data object within the object based storage;
   updating the stream; and
   updating the first data object within the object based storage.

20. The System of claim 19, wherein updating the data object comprises:
   designating the previous data object as removed and updating the first data object with a time of removal.

\* \* \* \* \*